(12) United States Patent
Bi

(10) Patent No.: US 9,760,484 B2
(45) Date of Patent: Sep. 12, 2017

(54) DATA PROCESSING METHOD AND ELECTRONIC DEVICE

(71) Applicants: Beijing Lenovo Software Ltd., Beijing (CN); Lenovo (Beijing) Limited, Beijing (CN)

(72) Inventor: Hongjiang Bi, Beijing (CN)

(73) Assignees: Beijing Lenovo Software Ltd., Beijing (CN); Lenovo (Beijing) Limited, Beijing (CN)

(*) Notice: Subject to any disclaimer, the term of this patent is extended or adjusted under 35 U.S.C. 154(b) by 206 days.

(21) Appl. No.: 14/755,428

(22) Filed: Jun. 30, 2015

(65) Prior Publication Data

US 2016/0210065 A1 Jul. 21, 2016

(30) Foreign Application Priority Data

Jan. 16, 2015 (CN) .......................... 2015 1 0024485

(51) Int. Cl.
```
G06F 12/00      (2006.01)
G06F 12/0802    (2016.01)
G06F 9/00       (2006.01)
G06F 11/00      (2006.01)
```
(52) U.S. Cl.
CPC ............ G06F 12/0802 (2013.01); G06F 9/00 (2013.01); G06F 11/00 (2013.01)

(58) Field of Classification Search
CPC ......... G06F 12/0802; G06F 11/00; G06F 9/00
See application file for complete search history.

(56) References Cited

U.S. PATENT DOCUMENTS

| 2005/0182922 A1* | 8/2005 | Guo | ...................... G06F 9/4843 713/1 |
| 2007/0283138 A1* | 12/2007 | Miga | ..................... G06F 9/4887 713/2 |
| 2014/0115193 A1* | 4/2014 | Liu | ....................... G06F 9/4405 710/8 |

* cited by examiner

Primary Examiner — Reginald Bragdon
Assistant Examiner — Hannah A Faye-Joyner
(74) Attorney, Agent, or Firm — Schwegman Lundberg & Woessner, P.A.

(57) ABSTRACT

Embodiments of the present disclosure provide a data processing method and an electronic device. The method is applied in an electronic device, the electronic device being configured with a CPU and a UEFI BIOS; the CPU comprising at least two executing cores each capable of executing one thread; the method comprising: obtaining a first instruction for backup/recovery of designated data when the UEFI BIOS is started to run; invoking a second executing core of the CPU based on the first instruction; and executing the backup/recovery of the designated data by the UEFI BIOS and the second executing core, wherein the UEFI BIOS is run by a first executing core of the CPU.

14 Claims, 4 Drawing Sheets

---

Obtaining A First Instruction For Backup/recovery Of Designated Data When The UEFI BIOS Is Started To Run — 101

Invoking A Second Executing Core Of The CPU Based On The First Instruction; And Executing The Backup/recovery Of The Designated Data By The UEFI BIOS And The Second Executing Core, Wherein The UEFI BIOS Is Run By A First Executing Core Of The CPU — 102

DATA PROCESSING METHOD AND ELECTRONIC DEVICE

CROSS-REFERENCE TO RELATED APPLICATION(S)

This application claims priority under 35 U.S.C. 119 to Chinese Application No. 201510024485.2, filed on Jan. 16, 2015, which is incorporated herein by reference in its entirety.

TECHNICAL FIELD

The present disclosure relates to a data processing technology, and in particular, to a data processing method and an electronic device.

BACKGROUND

In the conventional technical solutions, both data backup and data recovery based on a BIOS System (Basic Input Output System) are performed in a single thread. That is, during a backup process of data, it is required that system data are read and compressed to generate a backup file, and the backup file is written into a specific storage area; and during a recovery process of data, it is required that the backup file is read and decompressed to generate a system installation file, and the system installation file is installed. Both of the two processes are consisted of serial operations, which causes the data backup and the data recovery inefficient and time consuming.

SUMMARY

In an aspect of the present disclosure, a data processing method applied in an electronic device is provided. The method may comprise steps of:

obtaining a first instruction for backup/recovery of designated data when a Unified Extensible Firmware Interface (UEFI) Basic Input Output System (BIOS) is started to run on a first executing core of a CPU in the electronic device;

invoking a second executing core of the CPU based on the first instruction; and executing the backup/recovery of the designated data by the UEFI BIOS and the second executing core.

In an preferable embodiment, the step of executing the backup/recovery of the designated data by the UEFI BIOS and the second executing core comprises: executing the backup/recovery of the designated data in parallel by the UEFI BIOS and the second executing core.

In an preferable embodiment, the first executing core can execute a first thread, and the second executing core can execute a second thread; the step of executing the backup/recovery of the designated data in parallel by the UEFI BIOS and the second executing core comprises:

dividing the designated data into M parts, M being a positive integer;

for each part of the designated data, reading a current data part, processing it in a first predetermined processing way and caching it into a first storage area by the first thread, when a first condition is satisfied, writing the cached current data part in the first storage area into a second storage area, when a second condition is satisfied, generating a second instruction, enabling the second thread in response to the second instruction, and writing, by the second thread, the cached current data part in the second storage area into a designated area, wherein, while the second thread begins to write the cached current data part in the second storage area into the designated area, the first thread begins to read a next data part, until no data parts remains.

Preferably, in case that the designated data are data to be backed up, the step of reading a current data part, processing it in a first predetermined processing way and caching it into a first storage area by the first thread comprises: reading and compressing the current data part, and caching the compressed current data part into the first storage area.

Alternatively, in case that the designated data are data to be recovered, the step of reading a current data part, processing it in a first predetermined processing way and caching it into a first storage area by the first thread comprises: reading and decompressing the current data part, and caching the decompressed current data part into the first storage area by the first thread; and the step of writing, by the second thread, the cached current data part in the second storage area into a designated area comprises: writing the decompressed current data part in the second storage area into the designated area by the second thread, so as to replace existing corresponding data part in the designated area.

Preferably, the criterion of satisfying the first condition comprises: caching the current data part into the first storage area is completed; or the first storage area is full.

Preferably, the criterion of satisfying the second condition comprises: writing the cached current data part in the first storage area into a second storage area is completed; or writing the cached current data part in the first storage area into a second storage area is completed is started.

In another aspect of the present disclosure, an electronic device is provided. The electronic device is provided with a Central Processing Unit (CPU) and a Unified Extensible Firmware Interface (UEFI) Basic Input Output System (BIOS). The CPU comprises at least two executing cores, each of the executing cores capable of executing one thread. The electronic device comprises:

an obtaining unit configured to obtain a first instruction for backup/recovery of designated data when the UEFI BIOS is started to run on a first executing core of the CPU;

an invoking unit configured to invoke a second executing core of the CPU based on the first instruction obtained by the obtaining unit; and a execution unit configured to execute the backup/recovery of the designated data by the UEFI BIOS and the second executing core.

In a preferable embodiment, the execution unit is further configured to execute the backup/recovery of the designated data in parallel by the UEFI BIOS and the second executing core.

In a preferable embodiment, the first executing core can execute a first thread, and the second executing core can execute a second thread; the execution unit is further configured to:

dividing the designated data into M parts, M being a positive integer, for each part of the designated data, reading a current data part, processing it in a first predetermined processing way and caching it into a first storage area by the first thread, when a first condition is satisfied, writing the cached current data part in the first storage area into a second storage area;

when a second condition is satisfied, generating a second instruction, enabling the second thread in response to the second instruction; and writing, by the second thread, the cached current data part in the second storage area into a designated area, wherein, while the second thread begins to write the cached current data part in the second storage area into the designated area, the first thread begins to read a next data part, until no data parts remains.

Preferable, in case that the designated data are data to be backed up, the execution unit is further configured to read and decompress the current data part, and cache the decompressed current data part into the first storage area by the first thread.

Alternatively, in case that the designated data are data to be recovered, the execution unit is further configured to: read and decompress the current data part, and cache the decompressed current data part into the first storage area by the first thread; and write the decompressed current data part in the second storage area into the designated area by the second thread, so as to replace existing corresponding data part in the designated area.

Preferable, the criterion of satisfying the first condition comprises: caching the current data part into the first storage area is completed; or the first storage area is full.

Preferable, the criterion of satisfying the second condition comprises: writing the cached current data part in the first storage area into a second storage area is completed; or writing the cached current data part in the first storage area into a second storage area is completed is started.

The data processing method and the electronic device are provided by the embodiments of the present disclosure. The electronic device is configured with a CPU (Central Processing Unit) and a UEFI (Unified Extensible Firmware Interface) BIOS (Basic Input Output System). The CPU comprises at least two executing cores, each of them capable of executing one thread. When the UEFI BIOS is started to run, a first instruction for backup/recovery of designated data is obtained. A second executing core of the CPU is invoked based on the first instruction. Then, the backup/recovery of the designated data is executed by the UEFI BIOS and the second executing core, wherein the UEFI BIOS is run on a first executing core of the CPU. Since the UEFI BIOS is a single thread task, only one executing core of the CPU is invoked for running the UEFI BIOS. The technical solutions according to the embodiments of the present disclosure implement execution of the backup/recovery of the designated data by invoking two executing cores of the CPU in the electronic device, which significantly improves efficiency of data backup/recovery and reduces the time required by the data backup/recovery, compared to the conventional data backup/recovery solutions performed in a single thread.

DETAILED DESCRIPTION OF THE EMBODIMENTS

Hereinafter the present disclosure will be described in detail in connection with the drawings and particular embodiments.

First Embodiment

Figure 1:
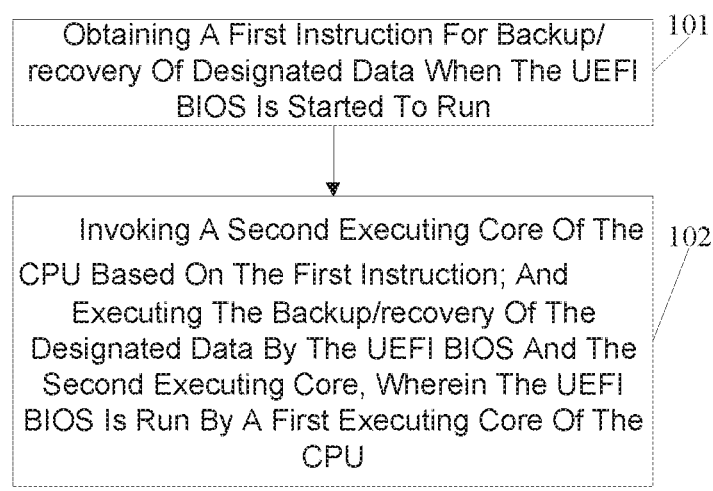
FIG. 1 is an exemplary flowchart of a data processing method according to a first embodiment of the present disclosure.

An embodiment of the present disclosure provides a data processing method, which is applied in an electronic device. FIG. 1 is an exemplary flowchart of the data processing method according to the first embodiment of the present disclosure. As shown in FIG. 1, the data processing method comprises the following steps.

In step 101, a first instruction for backup/recovery of designated data is obtained when the UEFI BIOS is started to run.

In the present embodiment, the electronic device is configured with a CPU and a UEFI BIOS. The CPU comprises at least two executing cores, each of which is capable of executing one thread. That is, the electronic device of the present embodiment has at least a dual-core CPU. Alternatively, the electronic device of the present embodiment may have a quad-core CPU or an eight-core CPU etc. .

The UEFI BIOS runs for booting an operating system after the electronic device is powered on. In particular, booting the operating system by the UEFI BIOS mainly comprises: 1) upon the device is powered on, initializing the UEFI BIOS; 2) booting the operating system; 3). entering the operating system. The UEFI BIOS runs after the electronic device is powered on, and an operable mode of the UEFI BIOS may be entered upon detecting a predetermined instruction. The predetermined instruction may be obtained by detecting a triggering operation on a combination of predetermined keys. In the operable mode of the UEFI BIOS, operations on respective hardware in the electronic device may be set, and the backup/recovery operation on the designated data according to the embodiment of the present disclosure may also be performed. That is, the data processing method provided by the present embodiment is applied in a duration when the UEFI BIOS is running, i.e., the backup/recovery of the designated data according to the present embodiment is executed when the operating system of the electronic device has not been entered.

In the operable mode of the UEFI BIOS, the first instruction may be particularly triggered by a mouse operation of a user, or by an operation of a specific key on a keyboard. If the first instruction is used for backup of the designated data, the designated data are data to be backed up, which may comprise, for example, operating system data and parts of installed application data etc. . Alternatively, if the first instruction is used for recovery of the designated data, the designated data are backup data, e.g., a backup copy of the operating system data and/or parts of the installed application data on which the backup operation has been previously performed by the electronic device. Generally, the backup data are stored in a magnetic disc partition in the electronic device different from the magnetic disc partition where the operating system is located.

In step 102, a second executing core of the CPU is invoked based on the first instruction, and the backup/recovery of the designated data is performed by the UEFI BIOS and the second executing core, wherein the UEFI BIOS is run by a first executing core of the CPU.

Here, the UEFI BIOS is a single thread task. That is, only one executing core (referred as the first executing core in the present embodiment) of the CPU is invoked for running the UEFI BIOS. The other executing core (referred as the second executing core in the present embodiment) of the CPU is in a sleeping state while only the UEFI BIOS is running. Therefore, in the present embodiment, upon the second executing core of the CPU is invoked based on the first instruction, the backup/recovery of the designated data is executed by the UEFI BIOS and the second executing core. In other words, the backup/recovery of the designated data is executed by the first executing core and the second executing core of the CPU.

In particular, the step of executing the backup/recovery of the designated data by the UEFI BIOS and the second executing core may comprise: executing the backup/recovery of the designated data in parallel by the UEFI BIOS and the second executing core, i.e., executing the backup/recovery of the designated data in parallel by the first executing core and the second executing core of the CPU.

In a preferred implementation, the first executing core can execute a first thread, and the second executing core can execute a second thread. The step of executing the backup/recovery of the designated data in parallel by the UEFI BIOS and the second executing core comprises:

dividing the designated data into M parts, M being a positive integer;
for each part of the designated data,
reading a current data part, processing it in a first predetermined processing way and caching it into a first storage area by the first thread,
when a first condition is satisfied, writing the cached current data part in the first storage area into a second storage area,
when a second condition is satisfied, generating a second instruction, enabling the second thread in response to the second instruction, and writing, by the second thread, the cached current data part in the second storage area into a designated area,
wherein, while the second thread begins to write the cached current data part in the second storage area into the designated area, the first thread begins to read a next data part, until no data parts remain.

As such, the technical solution provided by the embodiment of the present disclosure performs the backup/recovery of the designated data by invoking two executing cores of the CPU in the electronic device, which significantly improves efficiency of data backup/recovery and reduces the time of the data backup/recovery, compared to the conventional data backup/recovery solutions performed in a single thread.

Second Embodiment

Figure 2:
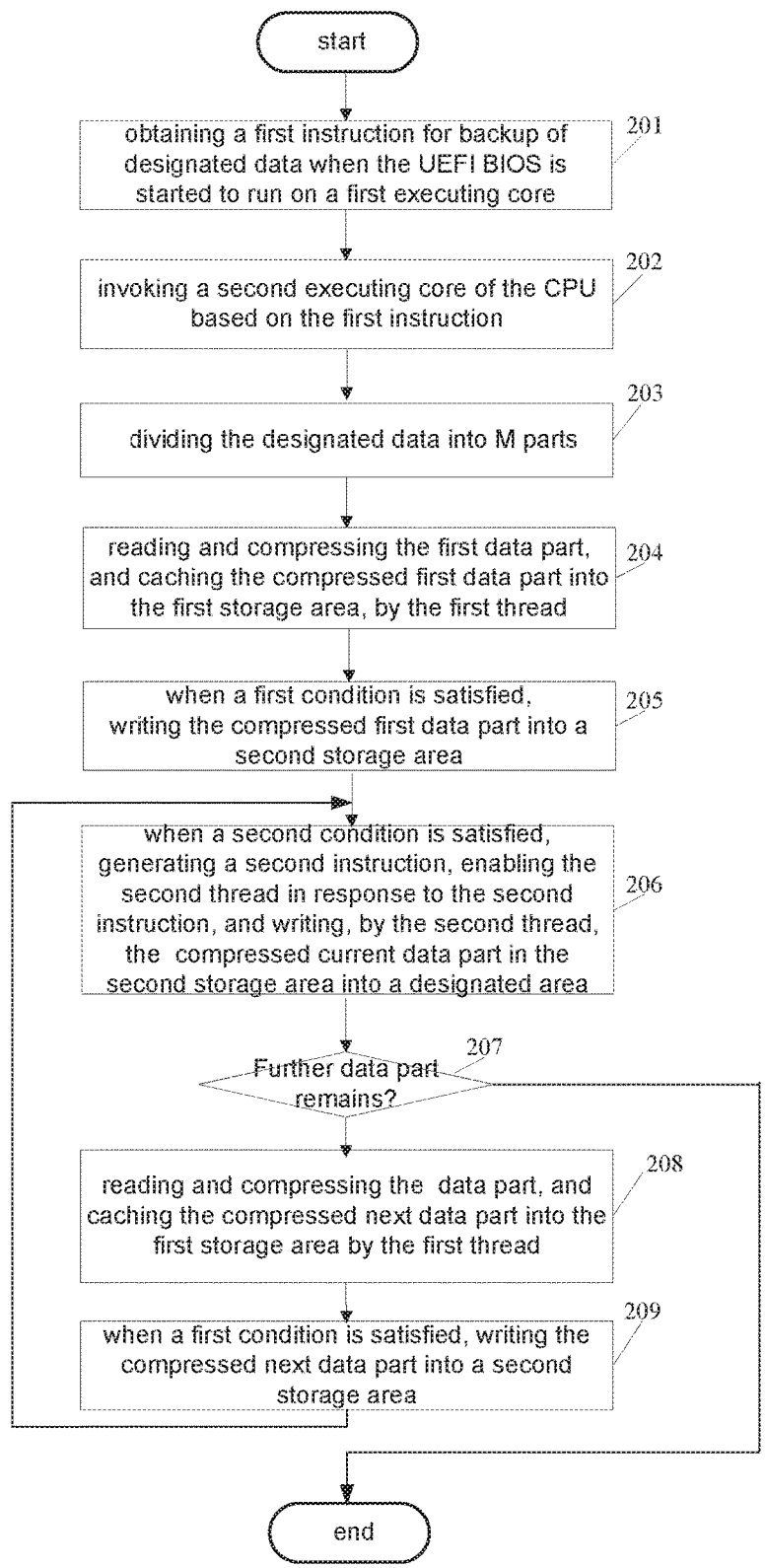
FIG. 2 is an exemplary flowchart of a data processing method according to a second embodiment of the present disclosure.

Based on the first embodiment, another embodiment of the present disclosure provides a further data processing method, which is applied in the electronic device. FIG. 2 is an exemplary flowchart of a data processing method according to a second embodiment of the present disclosure. As shown in FIG. 2, the data processing method comprises following steps.

In step 201, a first instruction for backup of designated data is obtained when the UEFI BIOS is started to run.

In the present embodiment, the electronic device is configured with a CPU and a UEFI BIOS. The CPU comprises at least two executing cores, each of which is capable of executing one thread. That is, the electronic device of the present embodiment has at least a dual-core CPU. Alternatively, the electronic device of the present embodiment may have a quad-core CPU or an eight-core CPU etc.

The UEFI BIOS runs for booting an operating system after the electronic device is powered on. In particular, booting the operating system by the UEFI BIOS mainly comprises: 1) upon the device is powered on, initializing the UEFI BIOS; 2) booting the operating system; 3). entering the operating system. The UEFI BIOS runs after the electronic device is powered on, and an operable mode of the UEFI BIOS may be entered upon detecting a predetermined instruction. The predetermined instruction may be obtained by detecting a triggering operation on a combination of predetermined keys. In the operable mode of the UEFI BIOS, operations on respective hardware in the electronic device may be set, and the backup operation on the designated data according to the embodiment of the present disclosure may also be performed. That is, the data processing method provided by the present embodiment is applied in a duration when the UEFI BIOS is running, i.e., the backup of the designated data according to the present embodiment is executed when the operating system of the electronic device has not been entered.

In the operable mode of the UEFI BIOS, the first instruction may be particularly triggered by a mouse operation of a user, or by an operation of a specific key on a keyboard. If the first instruction is used for backup of the designated data, the designated data are data to be backed up, which may comprise, for example, operating system data and parts of installed application data etc.

In step 202, a second executing core of the CPU is invoked based on the first instruction. In this embodiment, the second executing core is different from the one on which the UEFI BIOS is running.

In step 203, the designated data are divided into M parts, in which M is a positive integer. The M parts of the designated data may be divided dependent on a space size of the first storage area, or dependent on sizes of respective files in the designated data. After division, the M parts of the designated data may be numbered as 1, 2, . . . M.

Then, each part of the designated data can be backup one by one by performing steps 204-209.

In step 204, in the first thread, a first data part is read, compressed and cached to the first storage area. Preferably, the first storage area is a buffer area for storing the data read and compressed by the first thread.

In the present embodiment, the first executing core of the CPU in the electronic device may execute the first thread, and the second executing core of the CPU in the electronic device may execute the second thread. The UEFI BIOS is a single thread task, i.e., only one executing core of the CPU being invoked for running the UEFI BIOS. Therefore, the UEFI BIOS may run on the first thread. Of course, the UEFI BIOS may alternatively run on the second thread. That is, reading, compressing and caching of the n-th data may be executed either on a same thread as the one running the UEFI BIOS, or on a different thread than the one running the UEFI BIOS. This application has no limitation on this regard.

In step 205, the compressed first data part cached in the first storage area is written into a second storage area, when a first condition is satisfied.

Here, satisfying the first condition comprises: determining that the first condition is satisfied when writing the first compressed data part into the first storage area is completed; or determining that the first condition is satisfied when the first storage area is written to be full.

In one implementation, the M parts of the designated data are divided dependent on the space size of the first storage area, i.e., the size of each part of the designated data are equal to the space size of the first storage area. The first condition is determined to be satisfied if the first storage area is written to be full. The first storage area being written to be full is equivalent to completion of writing some part of the designated data into the first storage area. In another implementation, the M parts of the designated data are divided dependent on the sizes of respective files in the designated data, wherein each part of the designated data is possibly less than the space size of the first storage area. In this case, the first condition is determined to be satisfied when writing the first compressed data part into the first storage area is completed.

Preferably, the second storage area is another buffer area for a data writing operation of the second thread.

In step 206, a second instruction is generated when a second condition is satisfied, and the second thread is enabled in response to the second instruction. In the second thread, the current compressed data part (in this turn, the compressed first data part) in the second storage area is written into a designated area.

Here, the designated area is an area where the backup data of the designated data are stored, which is generally different from the area where the operating system of the electronic device is located.

Here, satisfying the second condition comprises: determining that the second condition is satisfied when writing the current compressed data part in the first storage area into the second storage area is completed; or determining that the second condition is satisfied when the current compressed data part in the first storage area is started to be written into the second storage area.

In Step 206, when the current compressed data in the first storage area is started to be written into the second storage area or writing the current compressed data part in the first storage area into the second storage area is completed, the second thread is enabled based on the generated second instruction. Enabling the second thread is to invoke another executing core of the CPU (the another executing core is the second executing core when the UEFI BIOS is based on the first executing core of the CPU). The second thread based on the second executing core performs subsequent tasks. The expressing of the second thread of the second executing core is only for the purpose of distinguishing from the first thread of the first executing core, and it does not mean that each executing core includes multiple threads. In the present embodiment, each executing core can only execute one thread.

Then, in step 207, it is judged whether there is further data part left (or unread).

If there is any data part left, i.e. the current data part is not the M-th data part, it proceeds to step 208.

In step 208, in the first thread, a next data part (in this turn, a second data part) is read, compressed and cached to the first storage area.

In step 209, the compressed next data part cached in the first storage area is written into a second storage area, when a first condition is satisfied.

After step 209 is completed, the method loops to step 206. In step 206, a second instruction is generated when a second condition is satisfied, and the second thread is enabled in response to the second instruction. In the second thread, the current compressed data part in the second storage area is written into a designated area (at this time, the decompressed next data part in step 209 becomes the current data part in the second storage area).

Then, the method goes to step 207.

If it is judged in step 207 that there is any data part left, steps 208, 209 and 206 are repeated for the next data part.

If it is judged in step 207 that there is no data part left, i.e. the current data part is the M-th data part, the method terminates.

It should be noted that, the first and second threads can be performed in parallel. Therefore, while the second thread begins to write the cached current data part in the second storage area into the designated area in step 206, the first thread may begin to read a next data part in step 208, until no data parts remain.

In particular, in the process of writing, by the second thread, the current compressed data part cached in the second storage area into the designated area (i.e. step 206), the next data part is read, compressed and cached to the first storage area by the first thread (i.e., step 208); after writing, by the second thread, the current compressed data part in the second storage area into the designated area is completed (i.e. step 206 is completed) or when the second thread starts to write the current compressed data part in the second storage area into the designated area (i.e. step 206 is started), the first thread writes the next data in the first storage area into the second storage area (i.e., Step 208); when the next compressed data part are started to be written into the second storage area (i.e. step 209 is started) or writing the current compressed data part into the second storage area is completed (i.e. step 209 is completed), the second instruction is generated, the second thread is enabled in response to the second instruction, and the next compressed data part (which becomes the current data part in the second storage area) are read by the first thread (i.e., Step 206 is repeated), and so on, until all parts of the designated data being read, compressed and written into the designated area are completed.

That is, when the first thread writing the current data part from the first storage area into the second storage area, or writing the current data part into the second storage area is completed, the first thread further reads the next part of data. Thus, the backup operation of the data is performed by the first and second threads in parallel. Thus, the efficiency of the data backup is significantly improved, and the time of the data backup is significantly reduced.

Third Embodiment

Figure 3:
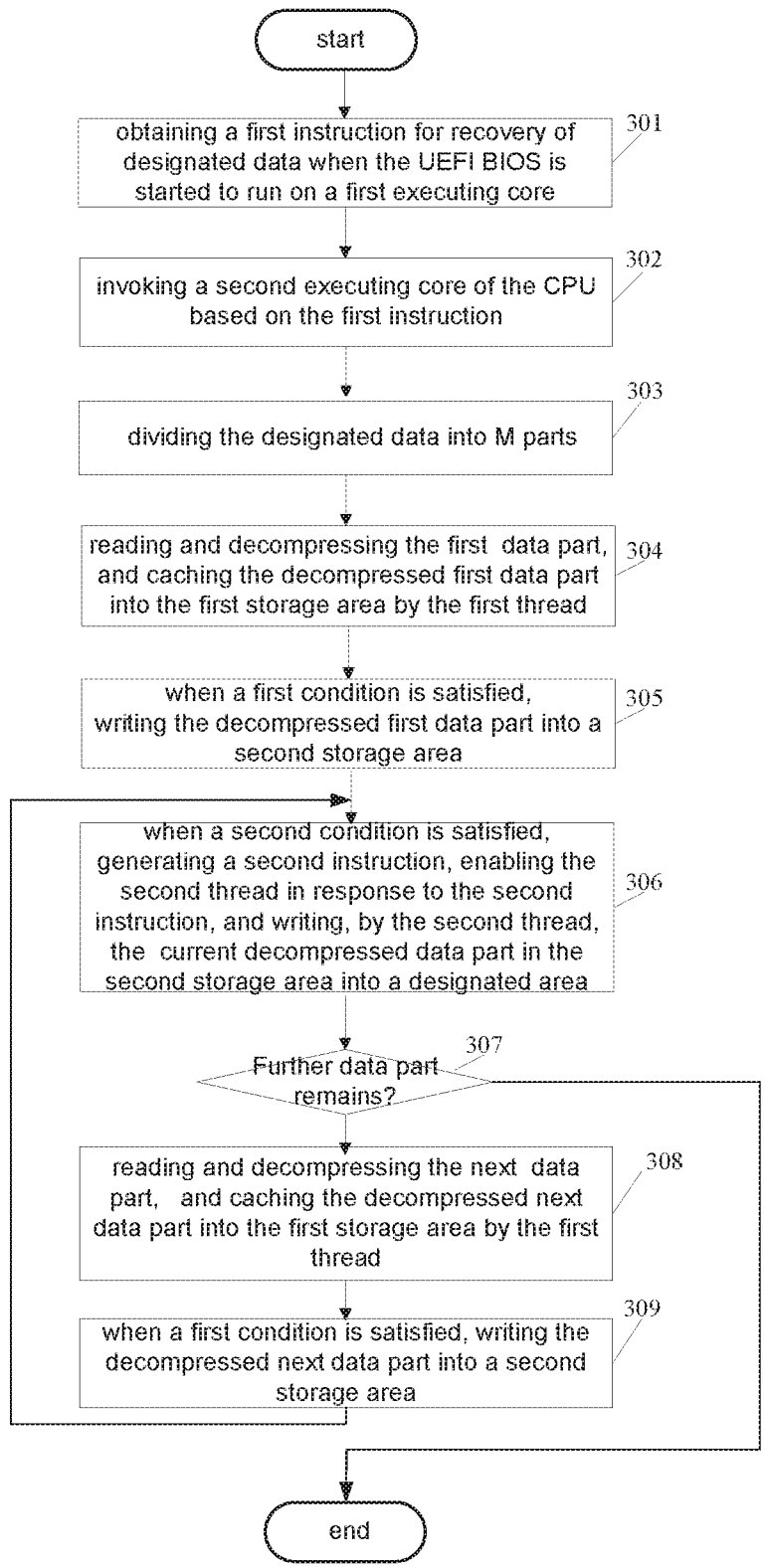
FIG. 3 is an exemplary flowchart of a data processing method according to a third embodiment of the present disclosure.

Based on the first embodiment, an embodiment of the present disclosure further provides a data processing method, which is applied in the electronic device. FIG. 3 is an exemplary flowchart of a data processing method according to a third embodiment of the present disclosure. As shown in FIG. 3, the data processing method comprises following steps.

In step 301, a first instruction for recovery of designated data is of obtained when the UEFI BIOS is started to run.

In the present embodiment, the electronic device is configured with a CPU and a UEFI BIOS. The CPU comprises at least two executing cores, each of which is capable of executing one thread. That is, the electronic device of the present embodiment has at least a dual-core CPU. Alternatively, the electronic device of the present embodiment may have a quad-core CPU or an eight-core CPU etc.

The UEFI BIOS runs for booting an operating system after the electronic device is powered on. In particular, booting the operating system by the UEFI BIOS mainly comprises: 1) upon the device is powered on, initializing the UEFI BIOS; 2) booting the operating system; 3). entering the operating system. The UEFI BIOS runs after the electronic device is powered on, and an operable mode of the UEFI BIOS may be entered upon detecting a predetermined instruction. The predetermined instruction may be obtained by detecting a triggering operation on a combination of predetermined keys. In the operable mode of the UEFI BIOS, operations on respective hardware in the electronic device may be set, and the recovery operation on the designated data according to the embodiment of the present disclosure may also be performed. That is, the data processing method provided by the present embodiment is applied in a duration when the UEFI BIOS is running, i.e., the recovery of the designated data according to the present embodiment is executed when the operating system of the electronic device has not been entered.

In the operable mode of the UEFI BIOS, the first instruction may be particularly triggered by a mouse operation of a user, or by an operation of a specific key on a keyboard. If the first instruction is used for recovery of the designated data, the designated data are backup data, e.g., a backup copy of the operating system data and/or parts of the installed application data on which the backup operation has been previously performed by the electronic device. Generally, the backup data are stored in a magnetic disc partition in the electronic device different from the magnetic disc partition where the operating system is located.

In step 302, a second executing core of the CPU is invoked based on the first instruction. In this embodiment, the second executing core is different from the one on which the UEFI BIOS is running.

In step 303, the designated data are divided into M parts, in which M is a positive integer. The M parts of the designated data may be divided dependent on a space size of the first storage area, or dependent on sizes of respective files in the designated data. After division, the M parts of the designated data may be numbered as 1, 2, . . . M.

Then, each part of the designated data can be recovery one by one by performing steps 304-309.

In step 304, in the first thread, the first data part is read, decompressed and cached to the first storage area. Preferably, the first storage area is a buffer area for storing the data read and decompressed by the first thread.

In the present embodiment, the first executing core of the CPU in the electronic device may execute the first thread, and the second executing core of the CPU in the electronic device may execute the second thread. However, the UEFI BIOS is the single thread task, i.e., only one executing core of the CPU being invoked for running the UEFI BIOS. Therefore, the UEFI BIOS may run on the first thread. Of course, the UEFI BIOS may alternatively run on the second thread. That is, reading, decompressing and caching of the n-th data may be executed either on a same thread as the one running the UEFI BIOS, or on a different thread than the one running the UEFI BIOS. This application has no limitation on this regard.

In step 305, the decompressed first data part cached in the first storage area is written into a second storage area, when a first condition is satisfied.

Here, satisfying the first condition comprises: determining that the first condition is satisfied when writing the first decompressed data part into the first storage area is completed; or determining that the first condition is satisfied when the first storage area is written to be full.

In one implementation, when the M parts of the designated data are divided dependent on the space size of the first storage area, i.e., the size of each part of the designated data is equal to the space size of the first storage area, the first condition is determined to be satisfied if the first storage area is written to be full. The first storage area being written to be full is equivalent to completion of writing some part of the designated data into the first storage area. In another implementation, when the M parts of the designated data are divided dependent on the sizes of respective files in the designated data, each part of the designated data is possibly less than the space size of the first storage area. In this case, the first condition is determined to be satisfied when writing the first decompressed data part into the first storage area is completed.

Preferably, the second storage area is another buffer area for a data writing operation of the second thread.

In step 306, a second instruction is generated when a second condition is satisfied, and the second thread is enabled in response to the second instruction; In the second thread, the current decompressed data part (in this turn, the decompressed first data part) in the second storage area is written into a designated area.

Here, the designated area is an area where the recovery data of the designated data are stored, which is generally different from the area where the operating system of the electronic device is located.

Here, satisfying the second condition comprises: determining that the second condition is satisfied when writing the current decompressed data part in the first storage area into the second storage area is completed; or determining that the second condition is satisfied when the current decompressed data part in the first storage area is started to be written into the second storage area.

In Step 306, when the current decompressed data in the first storage area is started to be written into the second storage area or writing the current decompressed data part in the first storage area into the second storage area is completed, the second thread is enabled based on the generated second instruction. Enabling the second thread is to invoke another executing core of the CPU (the another executing core is the second executing core when the UEFI BIOS is based on the first executing core of the CPU). The second thread based on the second executing core performs subsequent tasks. The expressing of the second thread of the second executing core is only for the purpose of distinguishing from the first thread of the first executing core, and it does not mean that each executing core includes multiple threads. In the present embodiment, each executing core can only execute one thread.

Then, in step 307, it is judged whether there is further data part left (or unread).

If there is any data part left, i.e. the current data part is not the M-th data part, it proceeds to step 308.

In step 308, in the first thread, a next data part (in this turn, a second data part) is read, decompressed and cached to the first storage area.

In step 309, the decompressed next data part cached in the first storage area is written into a second storage area, when a first condition is satisfied.

After step 309 is completed, the method loops to step 306. In step 306, a second instruction is generated when a second condition is satisfied, and the second thread is enabled in response to the second instruction. In the second thread, the current decompressed data part in the second storage area is written into a designated area (at this time, the decompressed next data part in step 209 becomes the current data part in the second storage area).

Then, the method goes to step 307.

If it is judged in step 307 that there is any data part left, steps 308, 309 and 306 are repeated for the next data part.

If it is judged in step 307 that there is no data part left, i.e. the current data part is the M-th data part, the method terminates.

In step 306, the current data part cached in the second storage area is written, by the second thread, into the designated area, in order to replace corresponding source data part in the designated area, until all parts of the designated data are written into the designated area to replace source designated data in the designated area so as to complete the recovery of the designated data, wherein the source designated data are original data of the designated data, and the designated area is the area where the source designated data are located.

Here, the source designated data are original data of the designated data, i.e., the designated data are the backup data of the source designated data. In general, the source designated data are operating system data in the electronic device, and possibly comprise parts of installed application data etc.

It should be noted that, the first and second threads can be performed in parallel. Therefore, while the second thread begins to write the cached current data part in the second storage area into the designated area in step 306, the first thread may begin to read a next data part in step 308, until no data parts remain.

In particular, in the process of writing, by the second thread, the current decompressed data part cached in the second storage area into the designated area (i.e. step 306), the next data part is read, decompressed and cached to the first storage area by the first thread (i.e., step 308); after writing, by the second thread, the current decompressed data part in the second storage area into the designated area is completed (i.e. step 306 is completed) or when the second thread starts to write the current decompressed data part in the second storage area into the designated area (i.e. step 306 is started), the first thread writes the next data in the first storage area into the second storage area (i.e., Step 308); when the next decompressed data part are started to be written into the second storage area (i.e. step 309 is started) or writing the current decompressed data part into the second storage area is completed (i.e. step 309 is completed), the second instruction is generated, the second thread is enabled in response to the second instruction, and the next decompressed data part (which becomes the current data part in the second storage area) are read by the first thread (i.e., Step 306 is repeated), and so on, until all parts of the designated data being read, decompressed and written into the designated area are completed.

That is, when the first thread writing the current data part from the first storage area into the second storage area, or writing the current data part into the second storage area is completed, the first thread further reads the next part of data. Thus, the recovery operation of the data is performed by the first and second threads in parallel. Thus, the efficiency of the data recovery is significantly improved, and the time of the data recovery is significantly reduced.

Fourth Embodiment

Figure 4:
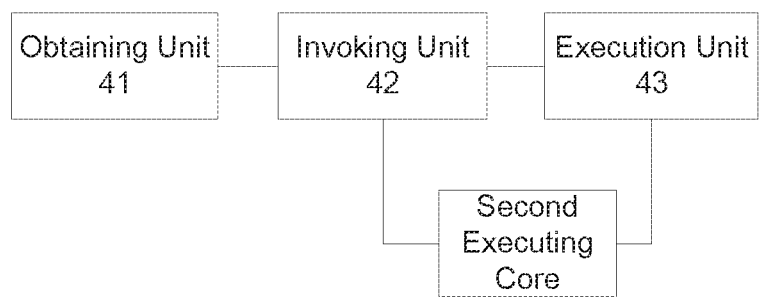
FIG. 4 is a schematic diagram of a structure of an electronic device according to an embodiment of the present disclosure.

An embodiment of the present disclosure further provides an electronic device. The electronic device is configured with a CPU and a UEFI BIOS. The CPU comprises at least two executing cores, each of which is capable of executing one thread. FIG. 4 is a schematic diagram of a structure of an electronic device according to an embodiment of the present disclosure. As shown in FIG. 4, the electronic device further comprises an obtaining unit 41, an invoking unit 42 and an execution unit 43.

The obtaining unit 41 is configured to obtain a first instruction for backup/recovery of designated data when the UEFI BIOS is started to run.

The invoking unit 42 is configured to invoke a second executing core of the CPU based on the first instruction obtained by the obtaining unit 41.

The execution unit 43 is configured to execute the backup/recovery of the designated data by the UEFI BIOS and the second executing core, wherein the UEFI BIOS is run by a first executing core of the CPU.

In particular, the execution unit 43 is configured to execute the backup/recovery of the designated data in parallel by the UEFI BIOS and the second executing core.

In particular, the execution unit 43 is further configured to:

dividing the designated data into M parts, M being a positive integer, for each part of the designated data, reading a current data part, processing it in a first predetermined processing way and caching it into a first storage area by the first thread, when a first condition is satisfied, writing the cached current data part in the first storage area into a second storage area;

when a second condition is satisfied, generating a second instruction, enabling the second thread in response to the second instruction; and writing, by the second thread, the cached current data part in the second storage area into a designated area, wherein, while the second thread begins to write the cached current data part in the second storage area into the designated area, the first thread begins to read a next data part, until no data parts remains.

In case that the designated data are data to be backed up, the execution unit 43 is further configured to read and decompress the current data part, and cache the decompressed current data part into the first storage area by the first thread.

In case that the designated data are data to be recovered, the execution unit is further configured to:

read and decompress the current data part, and cache the decompressed current data part into the first storage area by the first thread; and write the decompressed current data part in the second storage area into the designated area by the second thread, so as to replace existing corresponding data part in the designated area.

In particular, the UEFI BIOS is a single thread task. That is, only one executing core (referred as the first executing core in the present embodiment) of the CPU is invoked for running the UEFI BIOS. The other executing core (referred as the second executing core in the present embodiment) of the CPU is in a sleeping state while only the UEFI BIOS is running. Therefore, in the present embodiment, upon the invoking unit 42 invokes the second executing core of the CPU based on the first instruction, the execution unit 43 executes the backup/recovery of the designated data via the UEFI BIOS and the second executing core. In other words, the backup/recovery of the designated data is executed by the first executing core and the second executing core of the CPU.

It should be understood by the skilled in the art that functions of respective processing units in the electronic device according to the embodiment of the present disclosure may be understood with reference to related description of the data processing method as previously described. Respective processing units in the electronic device according to the embodiment of the present disclosure may be implemented by an analog circuit which implements the functions of the embodiments of the present disclosure, and may also be implemented by running software for performing the functions of the embodiments of the present disclosure on an intelligent terminal.

Fifth Embodiment

An embodiment of the present disclosure further provides an electronic device. The electronic device is configured with a CPU and a UEFI BIOS. The CPU comprises at least two executing cores, each of which is capable of executing one thread. In particular, the first executing core may execute the first thread, and the second executing core may execute the second thread. As shown in FIG. 4, the electronic device further comprises an obtaining unit 41, an invoking unit 42 and an execution unit 43.

The obtaining unit 41 is configured to obtain a first instruction for backup/recovery of designated data when the UEFI BIOS is started to run.

The invoking unit 42 is configured to invoke a second executing core of the CPU based on the first instruction obtained by the obtaining unit 41.

The execution unit 43 is configured to read the n-th data by the first thread, and compress the n-th data to the first storage area, wherein the n-th data is a n-th part of the designated data, n being a positive integer; to write the n-th data in the first storage area into a second storage area, when a first condition is satisfied; to generate a second instruction when a second condition is satisfied, and to enable the second thread in response to the second instruction; and to read (n+1)-th data by the first thread, then compress and cache the (n+1)-th data to the first storage area; to write, by the second thread, the n-th data in the second storage area into a designated area, until writing the designated data into the designated area is completed, wherein the UEFI BIOS runs by the first executing core of the CPU.

Satisfying the first condition comprises: determining that the first condition is satisfied when writing the n-th data into the first storage area is completed; or determining that the first condition is satisfied when the first storage area is written to be full.

Satisfying the second condition comprises: determining that the second condition is satisfied when writing the n-th data in the first storage area into the second storage area is completed; or determining that the second condition is satisfied when the n-th data in the first storage area is started to be written into the second storage area.

It should be understood by the skilled in the art that functions of respective processing units in the electronic device according to the embodiment of the present disclosure may be understood with reference to related description of the data processing method as previously described. Respective processing units in the electronic device according to the embodiment of the present disclosure may be implemented by an analog circuit which implements the functions of the embodiments of the present disclosure, and may also be implemented by running software for performing the functions of the embodiments of the present disclosure on an intelligent terminal.

Sixth Embodiment

An embodiment of the present disclosure further provides an electronic device. The electronic device is configured with a CPU and a UEFI BIOS. The CPU comprises at least two executing cores each, of which is capable of executing one thread. In particular, the first executing core may execute the first thread, and the second executing core may execute the second thread. As shown in FIG. 4, the electronic device further comprises an obtaining unit 41, an invoking unit 42 and an execution unit 43.

The obtaining unit 41 is configured to obtain a first instruction for backup/recovery of designated data when the UEFI BIOS is started to run.

The invoking unit 42 is configured to invoke a second executing core of the CPU based on the first instruction obtained by the obtaining unit 41.

The execution unit 43 is configured to read the n-th data by the first thread, and decompress the n-th data to the first storage area, wherein the n-th data is a n-th part of the designated data, n being a positive integer; to write the n-th data in the first storage area into a second storage area, when a first condition is satisfied; to generate a second instruction when a second condition is satisfied, and enable the second thread in response to the second instruction; and to read (n+1)-th data by the first thread, then decompress and cache the (n+1)-th data to the first storage area; to write, by the second thread, the n-th data in the second storage area into a designated area, in order to replace source n-th data in the designated area, until the designated data are written into the designated area to replace source designated data in the designated area so as to complete the recovery of the designated data; wherein the source n-th data is original data of the n-th data, the source designated data are original data of the designated data, and the designated area is an area where the source designated data are located, wherein the UEFI BIOS runs by the first executing core of the CPU.

Satisfying the first condition comprises: determining that the first condition is satisfied when writing the n-th data into the first storage area is completed; or determining that the first condition is satisfied when the first storage area is written to be full.

Satisfying the second condition comprises: determining that the second condition is satisfied when writing the n-th data in the first storage area into the second storage area is completed; or determining that the second condition is satisfied when the n-th data in the first storage area is started to be written into the second storage area.

It should be understood by the skilled in the art that functions of respective processing units in the electronic device according to the embodiment of the present disclosure may be understood with reference to related description of the data processing method as previously described. Respective processing units in the electronic device according to the embodiment of the present disclosure may be implemented by an analog circuit which implements the functions of the embodiments of the present disclosure, and may also be implemented by running software for performing the functions of the embodiments of the present disclosure on an intelligent terminal.

In the fourth to sixth embodiments, the obtaining unit 41, the invoking unit 42 and the executing unit 43 in the electronic device may be implemented by CPU, DSP (Digital Signal Processor) or FPGA (Field-Programmable Gate Array) in the electronic device in actual applications.

It may be appreciated by the skilled in the art that the embodiments of the present disclosure may be implemented as a method, a system or a computer program product. The present disclosure may include pure hardware embodiments, pure software embodiments and any combination thereof. Also, the present disclosure may include a computer program product implemented on one or more computer readable storage medium (including, but not limited to, magnetic disk storage, CD-ROM, optical storage) containing computer readable program codes.

The present disclosure have been described with reference to the flowcharts and/or block diagrams of the method, device (system) and computer program product according to the embodiments of the present disclosure. It may be appreciated that each process and/or block in the flowcharts and/or block diagrams, or any combination thereof, may be implemented by computer program instructions. Such computer program instructions may be provided to a general computer, a dedicated computer, an embedded processor or a processor of any other programmable data processing device to constitute a machine, such that the instructions executed by the computer or the processor of any other programmable data processing device may constitute means for implementing the functions specified by one or more processes in the flowcharts and/or one or more blocks in the block diagrams.

These computer program instructions may also be stored in a computer readable memory that may direct a computer or any other programmable data processing device to operate in a particular way. Thus, the instructions stored in the computer readable memory constitute an article of manufacture including instruction means for implementing the functions specified by one or more processes in the flowcharts and/or one or more blocks in the block diagrams.

These computer program instructions may also be loaded onto a computer or any other programmable data processing device, such that the computer or the programmable data processing device may perform a series of operations/steps to achieve a computer-implemented process. In this way, the instructions executed on the computer or the programmable data processing device may provide steps for implementing the functions specified by one or more processes in the flowcharts and/or one or more blocks in the block diagrams.

The above are only preferred embodiments of the present disclose, and are not limitations of the protection scope of the present disclosure.

What is claimed is:

1. A data processing method applied in an electronic device, comprising steps of:
   obtaining a first instruction for backup/recovery of designated data when a Unified Extensible Firmware Interface (UEFI) Basic Input Output System (BIOS) is started to run on a first executing core of a CPU in the electronic device;
   invoking a second executing core of the CPU based on the first instruction; and
   executing the backup/recovery of the designated data by the UEFI BIOS and the second executing core.

2. The method according to claim 1, wherein the step of executing the backup/recovery of the designated data by the UEFI BIOS and the second executing core comprises: executing the backup/recovery of the designated data in parallel by the UEFI BIOS and the second executing core.

3. The method according to claim 2, wherein the first executing core can execute a first thread, and the second executing core can execute a second thread; and wherein the step of executing the backup/recovery of the designated data in parallel by the UEFI BIOS and the second executing core comprises:
   dividing the designated data into M parts, M being a positive integer;
   for each part of the designated data,
   reading a current data part, processing it in a first predetermined processing way and caching it into a first storage area by the first thread,
   when a first condition is satisfied, writing the cached current data part in the first storage area into a second storage area, and
   when a second condition is satisfied, generating a second instruction, enabling the second thread in response to the second instruction, and writing, by the second thread, the cached current data part in the second storage area into a designated area,
   wherein, while the second thread begins to write the cached current data part in the second storage area into the designated area, the first thread begins to read a next data part, until no data parts remain.

4. The method according to claim 3, wherein in case that the designated data are data to be backed up, the step of reading a current data part, processing it in a first predetermined processing way and caching it into a first storage area by the first thread comprises:
   reading and compressing the current data part, and caching the compressed current data part into the first storage area.

5. The method according to claim 3, wherein in case that the designated data are data to be recovered,
   the step of reading a current data part, processing it in a first predetermined processing way and caching it into a first storage area by the first thread comprises:
   reading and decompressing the current data part, and caching the decompressed current data part into the first storage area by the first thread,
   and the step of writing, by the second thread, the cached current data part in the second storage area into a designated area comprises:
   writing the decompressed current data part in the second storage area into the designated area by the second thread, so as to replace existing corresponding data part in the designated area.

6. The method according to claim 3, wherein the criterion of satisfying the first condition comprises: caching the current data part into the first storage area is completed; or the first storage area is full.

7. The method according to claim 3, wherein the criterion of satisfying the second condition comprises: writing the cached current data part in the first storage area into a second storage area is completed; or writing the cached current data part in the first storage area into a second storage area is completed is started.

8. An electronic device provided with a Central Processing Unit (CPU) and a Unified Extensible Firmware Interface (UEFI) Basic Input Output System (BIOS), the CPU comprising at least two executing cores, each of the executing cores capable of executing one thread, the electronic device comprising:
   an obtaining unit configured to obtain a first instruction for backup/recovery of designated data when the UEFI BIOS is started to run on a first executing core of the CPU;
   an invoking unit configured to invoke a second executing core of the CPU based on the first instruction obtained by the obtaining unit; and
   an execution unit configured to execute the backup/recovery of the designated data by the UEFI BIOS and the second executing core.

9. The electronic device according to claim 8, wherein the execution unit is further configured to execute the backup/recovery of the designated data in parallel by the UEFI BIOS and the second executing core.

10. The electronic device according to claim 9, wherein the first executing core can execute a first thread, and the second executing core can execute a second thread; the execution unit is further configured to:

dividing the designated data into M parts, M being a positive integer, for each part of the designated data, reading a current data part, processing it in a first predetermined processing way and caching it into a first storage area by the first thread, when a first condition is satisfied, writing the cached current data part in the first storage area into a second storage area; and when a second condition is satisfied, generating a second instruction, enabling the second thread in response to the second instruction; and writing, by the second thread, the cached current data part in the second storage area into a designated area, wherein, while the second thread begins to write the cached current data part in the second storage area into the designated area, the first thread begins to read a next data part, until no data parts remains.

11. The electronic device according to claim 10, wherein in case that the designated data are data to be backed up, the execution unit is further configured to read and decompress the current data part, and cache the decompressed current data part into the first storage area by the first thread.

12. The electronic device according to claim 10, wherein in case that the designated data are data to be recovered, the execution unit is further configured to:

read and decompress the current data part, and cache the decompressed current data part into the first storage area by the first thread; and write the decompressed current data part in the second storage area into the designated area by the second thread, so as to replace existing corresponding data part in the designated area.

13. The electronic device according to claim 10, wherein the criterion of satisfying the first condition comprises: caching the current data part into the first storage area is completed; or the first storage area is full.

14. The electronic device according to claim 10, wherein the criterion of satisfying the second condition comprises: writing the cached current data part in the first storage area into a second storage area is completed; or writing the cached current data part in the first storage area into a second storage area is completed is started.

\* \* \* \* \*